US011222483B2

(12) United States Patent
Hickenbottom et al.

(10) Patent No.: US 11,222,483 B2
(45) Date of Patent: Jan. 11, 2022

(54) SYSTEM AND METHOD FOR DETECTING VEHICLE ENVIRONMENTAL EXPOSURE AND FOR DETERMINING MAINTENANCE SERVICE ACCORDING TO DETECTED EXPOSURE

(71) Applicant: HONEYWELL INTERNATIONAL INC., Morris Plains, NJ (US)

(72) Inventors: Chris Hickenbottom, Glendale, AZ (US); Tomas Rudolecky, Jarom (CZ); Aric Reutlinger, Scottsdale, AZ (US); Katerina Gregorova, Unanov (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 254 days.

(21) Appl. No.: 16/406,974

(22) Filed: May 8, 2019

(65) Prior Publication Data

US 2020/0357193 A1 Nov. 12, 2020

(51) Int. Cl.
*G07C 5/00* (2006.01)
*G06Q 30/02* (2012.01)
*G07C 5/08* (2006.01)

(52) U.S. Cl.
CPC ......... *G07C 5/006* (2013.01); *G06Q 30/0224* (2013.01); *G07C 5/008* (2013.01); *G07C 5/0841* (2013.01)

(58) Field of Classification Search
CPC ...... G07C 5/006; G07C 5/008; G07C 5/0841; G06Q 30/0224
See application file for complete search history.

(56) References Cited

U.S. PATENT DOCUMENTS

| 5,646,400 A | 7/1997 | Perez et al. |
| 8,577,703 B2 | 11/2013 | McClellan et al. |
| 10,916,075 B1* | 2/2021 | Webster ................. G07C 5/008 |
| 2007/0112487 A1 | 5/2007 | Avery et al. |
| 2010/0262442 A1 | 10/2010 | Wingenter |
| 2011/0172873 A1 | 7/2011 | Szwabowski et al. |

(Continued)

FOREIGN PATENT DOCUMENTS

| CN | 104217121 A | 12/2014 |
| CN | 108068730 A | 5/2018 |

(Continued)

OTHER PUBLICATIONS

Author: Yuri et al. Title: Atmospheric Corrosion Performance of Carbon Steel, Galvanized Steel, Aluminum and Copper in the North Brazilian Coast Date: 2007 Publisher: J. Braz. Chem. Soc. (Year: 2007).*

(Continued)

*Primary Examiner* — James J Lee
*Assistant Examiner* — Steven Vu Nguyen
(74) *Attorney, Agent, or Firm* — Lorenz & Kopf, LLP

(57) ABSTRACT

A method of operating a usage-based maintenance system for a vehicle among a plurality of vehicles includes determining, for a time period, an exposure parameter of the vehicle. The exposure parameter indicates an amount of exposure to an environment during the time period. The method also includes scoring the exposure parameter according to an exposure model to produce an exposure score. Moreover, the method includes determining a maintenance discount according to the exposure score.

19 Claims, 7 Drawing Sheets

(56) References Cited

U.S. PATENT DOCUMENTS

| | | |
|---|---|---|
| 2013/0317665 A1 | 11/2013 | Fernandes et al. |
| 2017/0183107 A1 | 6/2017 | Brookhart et al. |
| 2017/0323244 A1* | 11/2017 | Rani ................ G06Q 10/06393 |
| 2020/0079532 A1* | 3/2020 | Rix ........................ G06N 20/20 |
| 2020/0152067 A1* | 5/2020 | Salles ...................... G08G 1/20 |

FOREIGN PATENT DOCUMENTS

| | | |
|---|---|---|
| EP | 2562701 A1 | 2/2013 |
| EP | 3106952 A1 | 12/2016 |

OTHER PUBLICATIONS

[Item U continued] vol. vol. 18 No. 1 p. 153-166 (Year: 2007).*
Traxler, Bill, "MSP Offers Rebates for Preferred Engine Operation," dated Nov. 7, 2018 downloaded from https://aerospace.honeywell.com/en/blogs/2018/november/msp-offers-rebates-for-preferred-engine-operation on May 8, 2019.

* cited by examiner

SYSTEM AND METHOD FOR DETECTING VEHICLE ENVIRONMENTAL EXPOSURE AND FOR DETERMINING MAINTENANCE SERVICE ACCORDING TO DETECTED EXPOSURE

TECHNICAL FIELD

The present disclosure generally relates to vehicle maintenance services and, more particularly, relates to a system and method for detecting vehicle environmental exposure and for determining maintenance services according to detected exposure.

BACKGROUND

Vehicles include complex components, such as engine systems, that require regular maintenance. For example, a user can cause wear on a vehicle engine over time, and maintenance services can address the engine wear and, in some cases, repair or replace the worn part. Accordingly, the maintenance services can keep the vehicle running efficiently and dependably.

However, maintenance costs can be expensive, and costs can be unpredictable. Also, the way the vehicle is used may correlate to the amount of wear on the engine. In some scenarios, however, maintenance costs can be the same for the different users. As such, a person that causes less wear can pay the same maintenance fees as another that causes more wear.

Thus, there is a need for a system and model that more fairly determines maintenance pricing. Other desirable features and characteristics of the systems and methods of the present disclosure will become apparent from the subsequent detailed description and the appended claims, taken in conjunction with the accompanying drawings and the preceding background.

BRIEF SUMMARY

In one embodiment, a method of operating a usage-based maintenance system for a vehicle among a plurality of vehicles is disclosed. The method includes determining, for a time period, an exposure parameter of the vehicle. The exposure parameter indicates an amount of exposure to an environment during the time period. The method also includes scoring the exposure parameter according to an exposure model to produce an exposure score. Moreover, the method includes determining a maintenance discount according to the exposure score.

In an additional embodiment, a usage-based maintenance system for a vehicle among a plurality of vehicles is disclosed. The system includes a processor and a sensor system configured to provide sensor input to the processor. The system further includes a data storage device having an exposure model stored thereon. The processor is configured to determine from the sensor input, for the time period, an exposure parameter of the vehicle. The exposure parameter indicates an amount of exposure to an environment during the time period. The processor is configured to score the determined exposure parameter according to the exposure model to produce an exposure score. Also, the processor is configured to determine a maintenance discount according to the exposure score.

In another embodiment, a method of operating a usage-based maintenance system for a vehicle among a plurality of vehicles arranged in a fleet is disclosed. The method includes detecting, for a time period, a location of the vehicle and detecting an amount of time spent at the detected location. The method also includes determining, for the time period, a salinity exposure parameter of the vehicle according to the detected amount of time spent at the detected location. Furthermore, the method includes scoring the salinity exposure parameter according to a fleet exposure model to produce an exposure score. The fleet exposure model is based on the salinity exposure of the plurality of vehicles across the fleet. Moreover, the method includes determining, for the time period, another usage parameter of the vehicle. The other usage parameter indicates another usage characteristic of the vehicle over the time period. The method additionally includes scoring the other usage parameter according to another fleet usage model to produce another usage score. Also, the method includes combining the exposure score and the other usage score to produce a combined usage score. Moreover, the method includes determining a maintenance discount according to the combined usage score.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
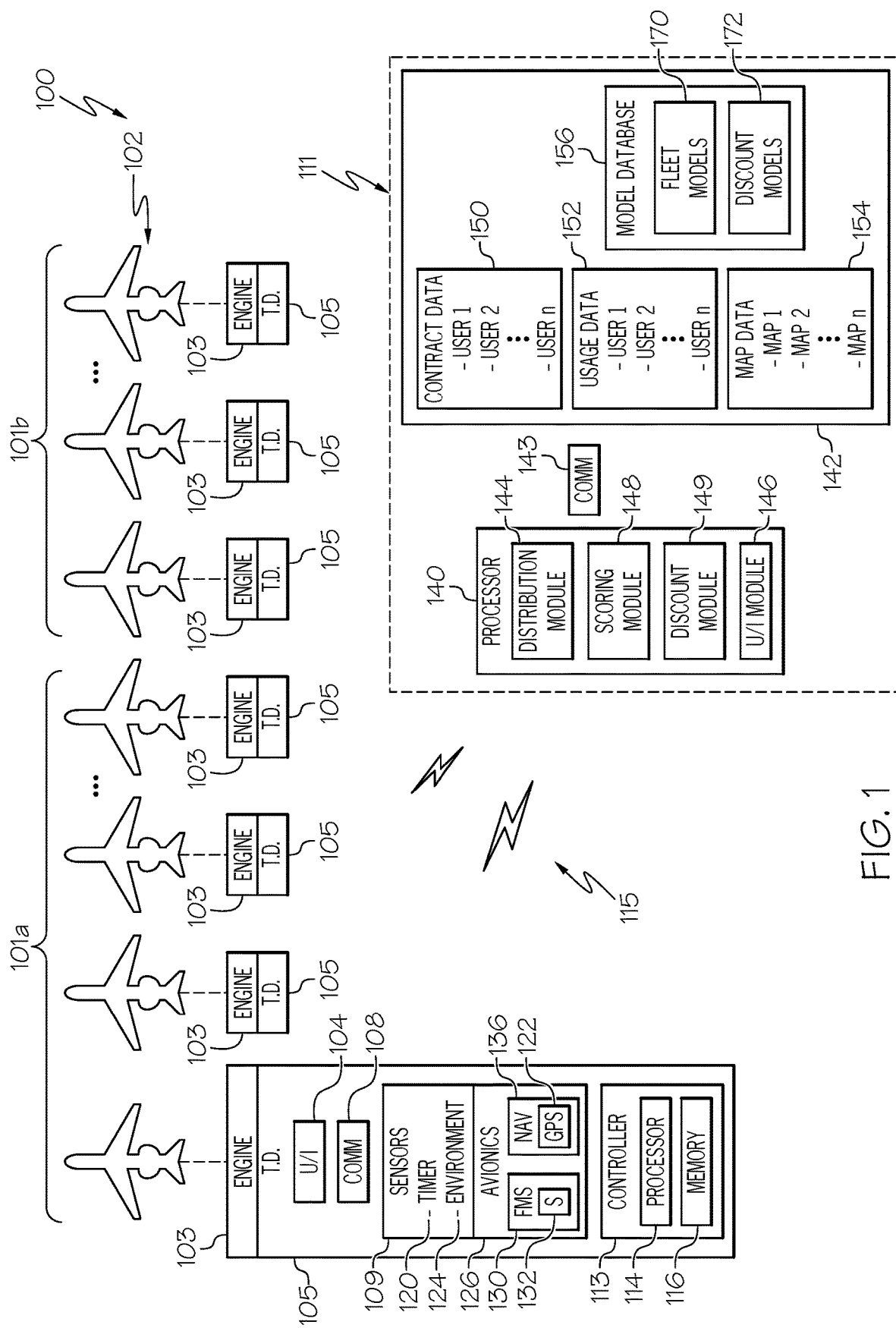
FIG. 1 is a schematic diagram of a system according to example embodiments of the present disclosure.

The following detailed description is merely exemplary in nature and is not intended to limit the present disclosure or the application and uses of the present disclosure. Furthermore, there is no intention to be bound by any theory presented in the preceding background or the following detailed description.

The present disclosure provides a system and method for pricing maintenance and/or other services for vehicles and/or the engines of the vehicles. In some embodiments, usage that causes less wear on an engine can result in higher discounts, larger rebates, and/or more credits. These rewards can be applied to future maintenance costs under the MSP.

Using the system of the present disclosure and its method of operations, pricing for maintenance on a vehicle engine may be adjusted according to a detected amount of exposure to harsh environments for that vehicle engine. Thus, pricing for servicing an engine may be dependent upon its usage (i.e., where the vehicle is located and the environments at those locations) over a given time frame. The system can monitor how a vehicle and its engines were used during a time period and adjust pricing accordingly. Generally, vehicle engines that are used in harsher environments that tend to cause more engine wear can result in smaller rewards. On the contrary, vehicle engines that have less exposure to these environments can result in larger rewards (e.g., higher discounts, larger rebates, and/or more credits) for the user and vice versa.

It will be appreciated that the system of the present disclosure may track various environmental usage characteristics for determining a user's reward. In some embodiments, for example, exposure to high salinity environments can be tracked. In additional embodiments, exposure to high humidity environments, high ambient temperature environments, high dust areas, or other environmental conditions can be tracked. This data may be processed for determining a reward tailored for a particular member according to their usage history. For example, scores for flight length, environmental exposure, and throttle settings may be generated, weighting factors may be applied to the different usage scores based on their associated maintenance cost impact, and the weighted scores may be combined to produce a combined usage score for a user. Then, a reward for that user may be generated according to the combined usage score.

In some embodiments, in addition to tracking environmental exposure parameters, the system may track other usage parameters, such as average flight time over the time period and/or throttle power usage parameters. The system may determine rewards based on these usage parameters as well.

Also, the system and methods of the present disclosure can track the usage characteristics of a plurality of users, a plurality of vehicles within a fleet, and/or a plurality of engines within the fleet. The system and methods may rely on data analytics to generate one or more fleet usage models, and a user's reward may be determined according to a comparison of one vehicle's usage characteristics compared to the fleet usage model.

Accordingly, in some embodiments, users that travel longer distances per trip may receive larger rewards than other users that travel shorter distances. Also, in some embodiments, throttle power settings may be monitored to characterize how much strain an engine endures over time, and users that put less strain on an engine than others may receive larger rewards as a result. Likewise, users whose vehicles spend less time exposed to harsh environmental conditions may receive higher rewards than other users with vehicles exposed to a larger degree.

Thus, the system and methods of the present disclosure provide fairer pricing for maintenance and/or other services. Users that use the engine in a manner that results in lower maintenance cost can earn higher discounts than users that put more strain on their engine. Also, users may be incentivized to use a vehicle and its engine in a manner that causes less wear over time. Additionally, the models used for adjusting and determining rewards for the users can be formulated for efficiently and effectively rewarding users at different levels based on their usage history.

Furthermore, the system and methods of the present disclosure provides useful information to users. The system and its methods can provide flexibility for users and provide them with data they can use to further improve the operation of their vehicle. Members can access information about their respective usage and can compare it to usage throughout the fleet. These systems and methods can also provide members with valuable historical usage information.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments. Any of the above devices are exemplary, non-limiting examples of a computer readable storage medium.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Any of the above devices are exemplary, non-limiting examples of a computer readable storage medium.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

In addition, those skilled in the art will appreciate that embodiments of the present disclosure may be practiced in conjunction with any method and/or system associated with a predictive user interface for a computerized vehicle control system. It will also be appreciated that the user interface methods and systems described herein are merely exemplary and configured according to the present disclosure. Further, it should be noted that many alternative or additional functional relationships or physical connections may be present in an embodiment of the present disclosure. In addition, while the figures shown herein depict examples with certain arrangements of elements, additional intervening elements, devices, features, or components may be present in an actual embodiment.

FIG. 1 depicts an exemplary embodiment of an engine maintenance system 100 according to example embodiments of the present disclosure. It will be understood that FIG. 1 is a simplified representation of the system 100 for purposes of explanation and ease of description, and that FIG. 1 is not intended to limit the application or scope of the subject matter in any way. Practical embodiments of the system 100 may vary from the illustrated embodiment without departing from the scope of the present disclosure. Also, the system 100 may include numerous other devices and components for providing additional functions and features, as will be appreciated in the art.

Generally, the system 100 may include a plurality of vehicles 102 that are arranged into one or more fleets 101a, 101b. In some embodiments, the vehicles 102 may be aircraft; however, it will be appreciated that the vehicles 102 may be of another type without departing from the scope of the present disclosure. In addition to the one or more engines 103, the vehicles 102 may respectively include a computerized terminal device 105.

The system 100 may also include a server device 111. The terminal devices 105 may be in communication with the server device 111 via a suitable communication network 115.

The engines 103 may be gas turbine engines, such as turbofan engines that propel the respective vehicle 102 and/or turboshaft engines that generate electric power for the respective vehicle 102. As will be discussed, the maintenance system 100 may be configured for facilitating maintenance on the engines 103 and/or for managing pricing and discounting of such maintenance services.

The fleets 101a, 101b of vehicles 102 may be arranged in various ways. For example, one fleet 101a may contain vehicles 102 of a certain type while another fleet 101b may contain vehicles 102 of a different type. In some embodiments, the first fleet 101a may include vehicles 102 with a configuration of the engine 103 (or engines) that is common to each within the fleet 101a. In contrast, the second fleet 101b may include vehicles 102 with a different configuration of engine 103. Accordingly, the vehicles 102 within the fleet 101a may include the same engine type, the same number of engines, etc., and the vehicles 102 within the other fleet 101b may include a different engine type, number of engines, etc.

The terminal device 105 may be a computerized device that supports operations of the system 100. The terminal device 105 of one of the vehicles 102 is illustrated in detail in FIG. 1, and it will be appreciated that the terminal devices 105 may include similar features. As shown, the terminal device 105 may include, without limitation, a user interface 104, a communication system 108, a sensor system 109, and a control system 113, suitably configured to support operation of the system 100 as described in greater detail below. The terminal device 105 may be incorporated within a flight control system, an electronic flight bag, a portable electronic device, and/or another device that supports operation of the system 100. Although the terminal devices 105 are represented as being onboard the vehicles 102 in FIG. 1, it will be appreciated that one or more features of the terminal device 105 may be independent of the vehicle 102 and/or may be a mobile device that is operable onboard or offboard the vehicle 102. Furthermore, the terminal device 105 may be embodied as a desktop computer, a smart phone, a tablet, or the like that communicates within the system 100.

The user interface 104 may include an input device with which a user (e.g., a pilot or other crewmember) may input commands, etc. The input device of the user interface 104 may include a keyboard, microphone, touch sensitive surface, control joystick, pointer device, touch sensitive surface such as a touch sensitive display, or other type. The user interface 104 may also include an output device that provides the user with information about the system 100 as will be discussed. The output device of the user interface 104 may include a visual display, a speaker, etc. The user interface 104 may include a variety of input and/or output devices. Furthermore, in some embodiments, the user interface 104 may be used by the pilot or other crew member to control the vehicle 102 (e.g., to change the aircraft's speed, trajectory, etc.). The user interface 104 is coupled to and in communication with the control system 113 and the processor 114 over a suitable architecture that supports the transfer of data, commands, power, etc. therebetween. Additionally, the user interface 104 and the processor 114 are cooperatively configured to allow a user to interact with other elements of the system 100 as will be discussed in more detail below.

Moreover, the communication system 108 may include one or more devices for communicating data between the server device 111 and one or more of the terminal devices 105. In an exemplary embodiment, the communication system 108 is coupled to the control system 113 and the processor 114 with a suitable architecture that supports the transfer of data, commands, power, etc. The communication system 108 may be configured to support communications to the vehicle 102, from the vehicle 102, and/or within the vehicle 102, as will be appreciated in the art. In this regard, the communication system 108 may be realized using any radio or non-radio communication system or another suitable data link system. In an exemplary embodiment, the communication system 108 is suitably configured to support communications between one vehicle 102 and another aircraft or ground location (e.g., air traffic control equipment and/or personnel).

The sensor system 109 may include one or more sensors configured to detect certain characteristics (usage characteristics) related to the use of the vehicle 102 and/or engines 103. For example, the sensor system 109 may include a timer device 120 that is configured to detect and measure the passage of time. Furthermore, the sensor system 109 may include one or more environment sensors 124. The environment sensor(s) 124 may be configured for detecting environmental conditions that affect the vehicle 102 and its engines 103. For example, the environment sensor(s) 124 may comprise a salinity sensor configured to detect the respective airborne salinity in the environment of the vehicle 102. Furthermore, the environment sensor 124 may comprise a thermometer configured to detect ambient temperature in the environment of the vehicle 102. The environment sensor 124 may comprise a hygrometer configured to detect humidity in the environment of the vehicle 102. Also, the environment sensor 124 may comprise a sensor that detects airborne dust exposure.

The sensor system 109 may, in some embodiments, include and/or may be associated with systems that are configured to support flight and associated operations of the vehicle 102. For example, the sensor system 109 may be associated with an avionics system 126 of the vehicle 102.

As shown in FIG. 1, the avionics system 112 may include and/or may be associated with a flight management system (FMS) 130. The FMS 130 may be operable for obtaining and/or providing real-time flight-related information. Furthermore, in some embodiments, the FMS 130 maintains information pertaining to a current flight plan (or alternatively, a current route or travel plan). Accordingly, the FMS 130 may include one or more FMS sensors 132 that detect real-time information. Specifically, the FMS sensors 132 may include an altimeter that detects the current altitude of the vehicle 102. Also, the FMS sensors 132 may be configured to detect the current, real-time trajectory of the vehicle 102, the airspeed of the vehicle 102, etc. Additionally, the FMS sensors 132 may detect the position of the throttle for the vehicle 102.

Moreover, information from the FMS sensors 132 or other system may be used to detect, track, or otherwise identify the current operating state (e.g., flight phase or phase of flight) of the vehicle 102. Various phases of flight are well known (e.g., a standing phase, a pushback or towing phase, a taxiing phase, a takeoff phase, a climbing phase, a cruising phase, a descent phase, an approach phase, a landing phase, and the like) and will not be described in detail herein. Also, the operating state (e.g., flight phase) may be determined according to an engine control system (e.g., a FADEC). Additionally, the flight management system 130 and/or other system may detect the current flight phase indirectly. For example, the FMS sensors 132 may comprise a weight-on-wheels sensor configured to detect that the vehicle 102 is landed. In addition to delineated flight phases, the flight management system 130 may identify other operating states of the vehicle 102 using the sensors 132, such as, for example, operation with one or more engines disabled, operation when afterburners onboard the vehicle 102 are being utilized, transonic and/or supersonic operation of the vehicle 102, and the like.

Additionally, the avionics system 126 may include or may be associated with a navigation system 136 of the vehicle 102 for supporting navigation operations of the vehicle 102. The navigation system 136 may be configured to obtain one or more navigational characteristics associated with operation of the vehicle 102. Accordingly, the navigation system 136 may include a positioning sensor 122 that is configured to detect a position of the respective vehicle 102. In some embodiments, the positioning sensor 122 may comprise a global positioning sensor (GPS) for detecting the global position of the respective vehicle 102; however, it will be appreciated that the positioning sensor 122 may be of another type without departing from the scope of the present disclosure. As such, the navigation system 128 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors 122 suitably configured to support operation of the navigation system 136, as will be appreciated in the art.

It will be appreciated that the avionics system 126 may include other sub-systems as well without departing from the scope of the present disclosure. For example, the avionics system 126 may include a flight control system, an air traffic management system, a radar system, a traffic avoidance system, an enhanced ground proximity warning system, an autopilot system, an autothrust system, a flight control system, a weather system, an electronic flight bag and/or another suitable avionics system.

The control system 113 may be a computerized device that includes at least one processor 114 and at least one data storage element 116. The data storage element 116 may be realized as RAM memory, flash memory, EPROM memory, EEPROM memory, registers, a hard disk, a removable disk, a CD-ROM, or any other form of storage medium known in the art. In this regard, the data storage element 116 can be coupled to the control system 113 and the processor 114 such that the processor 114 can read information from (and, in some cases, write information to) the data storage element 116. In the alternative, the data storage element 116 may be integral to the processor 114. As an example, the processor 114 and the data storage element 116 may reside in an ASIC. In practice, a functional or logical module/component of the control system 113 might be realized using program code that is maintained in the data storage element 116.

The processor 114 may include hardware, software, and/or firmware components configured to facilitate communications and/or interactions between the user interface 104, the communication system 108, the sensor system 109, the avionics system(s) 126, and the data storage element 116. The processor 114 may also perform additional tasks and/or functions described in greater detail below.

Depending on the embodiment, the processor 114 may be implemented or realized with a general-purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processor 114 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processor 114 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processor 114, or in any practical combination thereof.

In some embodiments, the features and/or functionality of the processor 114 may be implemented as part of the sensor system 109 for detecting usage characteristics of the respective vehicle 102 and for supporting operations of the system 100 as will be discussed. Furthermore, the processor 114 may be implemented as part of the flight management system 130 for managing flight operations. Likewise, the processor 114 may be coupled to the navigation system 136 for obtaining real-time navigational data and/or information regarding operation of the vehicle 102. The processor 114 may also be coupled to the sensor system 109, which in turn, may also be coupled to the FMS 130, the navigation system 136, the communication system 108, and one or more additional avionics systems 126 to support navigation, flight planning, and other aircraft control functions, as well as to provide real-time data and/or information regarding operation of the vehicle 102 to the processor 114.

Accordingly, as will be discussed, the sensor system 109 of the terminal device 105 may detect (i.e., measure) and track usage characteristics about the respective vehicle 102 and/or its engine(s) 103 over a predetermined time period. In some embodiments, the sensor system 109 may detect a plurality of usage characteristics including, but not limited to, flight time for the vehicle 102, time spent at different flight stages, location of the vehicle 102 and/or environmental conditions at those locations, and/or throttle positions over the time period. This data may be stored at the data storage element 116 in some embodiments. These detected usage characteristics can be utilized, therefore, to characterize how the vehicle 102 and the respective engine(s) 103 was used during the given time period. Similarly, the terminal devices 105 of the other vehicles 102 may similarly track the usage characteristics across the fleets 101a, 101b.

The usage characteristics detected and tracked by the terminal device 105 may be sent (via the communications system 108) to the server device 111 for further processing and data analysis. In additional embodiments, the processor 114 may perform local processing and perform at least some data analysis on the tracked usage characteristics before being sent to the server device 111 for further processing.

The server device 111 may be a computerized device that generally includes one or more processors 140, one or more data storage devices 142, and a communication device 143. The server device 111 may enable centralized computing, at least, with respect to maintenance services, pricing of maintenance services, and/or discounting maintenance services for the engines 103 of the vehicles 102 within the different fleets 101a, 101b. Accordingly, the server device 111 may be configured as a central server and a substantial amount of the processing/computing of vehicle use data, maintenance data, discount data, and/or other data may be performed by the processor 140 in cooperation with the data storage device 134. In some embodiments, the server device 111 may be responsible for delivering application logic, processing and providing computing resources to the terminal devices 105.

The communication device 143 may include one or more devices for communicating with the communication systems 108 of the terminal devices 105. Usage characteristics (i.e., usage data) tracked and sent by the terminal devices 105 may be communicated to the server device 111 via the communication device 143.

The processor 140 may include hardware, software, and/or firmware components configured, for example, to process usage data from the plurality of terminal devices 105. The processor 140 may include various modules for performing these tasks based on input received from the terminal devices 105. In some embodiments, the processor 140 may include a distribution module 144 programmed for compiling and generating a fleet-wide distributions of the usage data for the engines 103 within the system 100. Also, the processor 140 may create one or more fleet usage models according to these distributions of usage data as will be discussed.

The processor 140 may additionally include a scoring module 148. The scoring module 148 may be programmed to score use of an engine 103 in comparison with the rest of the usage of engines within the same fleet. As will be discussed, the processor 140 may receive detected usage characteristics of one of the vehicles 102 within one of the fleets 101a. Then, the processor 140 may determine one or more usage parameters, each indicating a usage characteristic for that vehicle 102 (e.g., a flight time usage parameter, an environmental exposure usage parameter, and/or a throttle power usage parameter). Next, the scoring module 148 may score the determined usage parameter according to a respective fleet usage model. The scoring module 148 may rely on a fleet usage model in order to evaluate a customer's use of an engine 103 during a given time period in comparison with usage across the fleet 101a.

Also, the processor 140 may include a discount module 149 programmed to determine a discount or other reward for a user based on the usage score output by the scoring module 148. Furthermore, the processor 140 may include a user interface module 146, which is programmed to present information about the discount, usage data, and other data to one or more terminal devices 105.

Depending on the embodiment, the processor 140 may be implemented or realized with a general-purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processor 140 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processor 140 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processor 140, or in any practical combination thereof.

The data storage device 142 may be realized as RAM memory, flash memory, EPROM memory, EEPROM memory, registers, a hard disk, a removable disk, a CD-ROM, or any other form of storage medium known in the art. In this regard, the data storage device 142 can be coupled to the processor 140 such that the processor 140 can read information from (and, in some cases, write information to) the data storage device 142. In the alternative, the data storage device 142 may be integral to the processor 140. As an example, the processor 140 and the data storage device 142 may reside in an ASIC. In practice, a functional or logical module/component of the processor 140 might be realized using program code that is maintained in the data storage device 142. Moreover, the data storage device 142 may include and/or access databases suitably configured to support operations of the system 100, such as, for example, a contract database 150, a usage database 152, a map database 154, and a model database 156, the contents of which will be discussed in detail below.

The contract database 150 may contain stored contract data for a plurality of individual users (indicated as "user 1" to "user n" in FIG. 1). These contracts may be configured in various ways and can include agreed-to terms for maintenance and maintenance pricing using the system 100. In some embodiments, for example, a membership service is provided in which members ("user 1" to "user n") enroll in a maintenance service plan (MSP) that covers maintenance on their vehicle 102 and/or the engine(s) 103 thereon. Members agree to pay an engine hour maintenance fee for future use of an engine 103 for a specified time period. Members can pay for engine maintenance services according to a predetermined per-hour rate. This can be comprehensive coverage that covers repair, replacement, refurbishment, retrofits, modifications, upgrades, user support, and the like. Accordingly, the system provides predictability regarding maintenance fees for the engines. Thus, members may be better able to manage future maintenance expenses. The contract database 150 may include contract data for each of the members ("user 1" to "user n"). The individual contract terms may differ from each other. For example, each contract may include different maintenance rates, different pricing escalation terms, different gratis terms, and different coverage terms, etc. In additional embodiments, the contracts may include substantially the same terms for each member.

The usage database 152 may store usage data (usage characteristics, usage parameters) that are tracked and received from the terminal devices 105. Thus, data within the usage database 152 may characterize usage of the vehicles 102 and/or engines 103 over given time periods.

In some embodiments, the usage data may be organized according to particular users ("user 1" to "user n") as indicated in FIG. 1; however, it will be appreciated that the usage data may be organized according to the particular vehicle 102, according to the particular engine 103, or otherwise.

Furthermore, the map database 154 may store maps (map data) of one or more types (identified as "map 1" through "map n" in FIG. 1). An example map 500 of the continental united states is shown in FIG. 5B. As shown, the map 500 may indicate environmental conditions for different mapped regions 511, 512, 513. In some embodiments, the map 500 may indicate air salinity for the different mapped regions 511, 512, 513. Accordingly, the map 500 represents the airborne salt content within the different regions 511, 512, 513. There may be high salinity first regions 513 near coastal areas. There may also be medium salinity second regions 512 further inland. Additionally, there may be low salinity third regions 511 even further inland. It will be appreciated that the map database 154 may store a plurality of such maps, and the maps may indicate environmental conditions for a variety of regions around the globe. Also, the maps may indicate airborne salinity, average humidity, ambient temperatures, airborne dust content, or other environmental conditions for the different mapped regions.

Moreover, the model database 156 may include one or more fleet usage models 170 used to evaluate a user's engine usage in comparison with usage within the fleet 101a, 101b over the same or similar time periods. Using the fleet usage model 170, the processor 140 may determine a usage score reflective of this comparison. Also, the model database 156 may include one or more discounting models 172 used to calculate a discount for the customer according to their assigned usage score.

Figure 2:
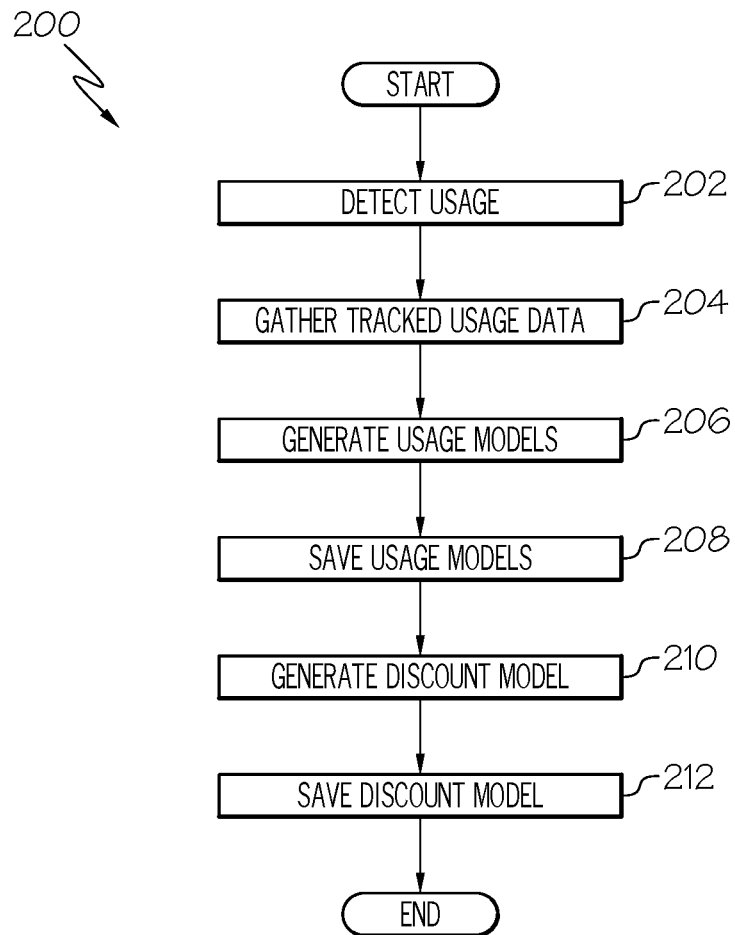
FIG. 2 is a flow chart illustrating a method of operating the system of FIG. 1 according to example embodiments.

Referring now to FIG. 2, a method 200 of operating the system 100 will be discussed according to example embodiments. In general, the method 200 may be employed for tracking use of the vehicles 102 and the engines 103 thereon. Also, the method 200 may be used for collecting this usage data and performing data analytics for generating one or more of the fleet usage models 170 from the tracked usage data. Additionally, the method 200 may be used to generate discount models 172 from the tracked usage data. The discount models 172 may be used for determining a user's maintenance discount for the time period.

As an example, it will be assumed that the method 200 is applied to the first fleet 101a. The method 200 may be similarly applied for vehicles 102 and engines 103 of the second fleet 101b. Also, it will be appreciated that the method 200 may be used for additional fleets of vehicles and engines.

For the sake of simplicity, it will be assumed that each vehicle 102 includes a single engine 103. However, it will be appreciated that the method 200 may accommodate vehicles 102 with multiple engines 103.

The following discussion will focus on "tracking and detecting usage of the engines 103" within the fleet 101a. It is understood that "tracking and detecting usage of one of the vehicles 102" equates to usage of the engine(s) 103 on that vehicle 102. Thus, these phrases are used interchangeably herein. Moreover, the term "usage" is used broadly herein. In some embodiments, the system 100 may track usage characteristics on occasions when the vehicle is in operation (when the engine 103 is powered ON) and on occasions when the vehicle is nonoperative (when the engine 103 is powered OFF).

The method 200 may begin at 202, wherein the terminal devices 105 of the vehicles 102 of the first fleet 101a track usage data for the respective engines 103. Specifically, the sensor system 109 of one vehicle 102 detects usage characteristics for the engines 103 thereon and provides sensor input to the respective processor 114. In some embodiments, at 202 of the method 200, the sensor system 109 may detect various usage conditions, such as flight time, environmental conditions, and/or throttle power settings for the respective engine 103. The processor 114 may save this sensor input in the data storage element 116. The terminal devices 105 of the other vehicles 102 may similarly collect usage data for the other engines 103 within the fleet 101a.

To detect flight time usage data, the control system 113 may utilize the FMS 130 or other system to distinguish between different flight phases, and the timer device 120 may record time spent between take-off and touch-down for different flights. This flight time usage data may be stored in the data storage element 116. In some embodiments, the processor 114 may process this time-of-flight data, for example, to find an average flight time for the engine 103 over a given time period and/or to determine use cycles for the respective engine 103.

To detect environmental exposure usage data, the sensor system 109 may detect environmental conditions directly with the environment sensors 124. For example, the environment sensor 124 may detect and track the amount of exposure of airborne salinity for the respective engine 103. In other embodiments, the sensor system 109 may utilize the GPS sensor to locate the vehicle 102, and the timer device 120 may time how long the vehicle 102 spends at the detected location. The sensor system 109 may track the location of the vehicle 102 as it moves throughout a time period. Also, in some embodiments, the sensor system 109 may locate the vehicle 102 and detect how long the vehicle 102 is parked on ground at the detected location. This location data may be stored in the data storage element 116. As will be discussed, this location data may be correlated with one or more maps stored in the map database 154 in order to determine the amount of exposure to harsh environments (e.g., high salinity environments).

Furthermore, the sensor system 109 may detect one or more conditions related to throttle power settings (i.e., PLA conditions). For example, the sensor system 109 may measure how the engines 103 are powered during specific phases of flight (e.g., at take-off, during climb, and at cruise). In some embodiments, the sensor system 109 may detect how much time is spent (over a given time period) with the throttle at a take-off power level and how much time is spent at a climb power level. Additionally, in some embodiments the control system 113 may utilize the FMS 130 or other system to distinguish between different flight phases. The timer device 120 may record time spent at take-off throttle settings, and this take-off usage data may be stored in the data storage element 116. Likewise, the timer device 120 may record time spent at climb throttle settings, and this climb usage data may be stored in the data storage element 116. Furthermore, the sensor system 109 may detect and track the throttle position when the vehicle 102 is at cruise settings, and this cruise usage data may be stored in the data storage element 116.

Next, the method 200 may continue at 204, wherein the usage data recorded by the plurality of terminal devices 105 is transferred to the server device 111. At 204 of the method 200, members may upload usage data to the server device 111 periodically (e.g., once a month). In other embodiments, the usage data recorded at 202 may be automatically uploaded to the server device 111. The communication system 108 of the terminal devices 105 may communicate the data to the communication device 143 of the server device 111, and the data may be saved at the usage database 152 of the server device 111.

In some embodiments, the processor 140 may further process the usage data received at 204. This may occur, for example, with regard to salinity exposure. As mentioned, at 202 of the method 200, the terminal device 105 may track the location of the vehicle 102 and how long the vehicle 102 spends parked at the detected location. In this example, at 204 of the method 200, the processor 140 of the server device 111 may correlate the detected location to the salinity exposure map 500 (FIG. 5B) stored at the map database 154. As discussed above, the map 500 may include the different regions 511, 512, 513, which have different assigned salinity exposure levels. The first region 513 may represent high salinity exposure level, such that one day spent in the first region 513 represents one "equivalent saltwater day." The second region 512 may represent lower exposure levels, such that one day spent in the second region 512 represents a lower "equivalent saltwater day." For example, one day spent in the second region 512 may represent 0.8 "equivalent saltwater days." The third region 511 may represent even lower exposure levels, such that one day spent in the third region 511 represents an even lower "equivalent saltwater day." For example, one day spent in the third region 511 may represent 0.5 "equivalent saltwater days." Accordingly, the processor 140 may calculate the total "equivalent saltwater days" for the vehicles 102 according to the detected amount of time spent at the assigned exposure levels. This exposure data may be saved at the usage database 152.

Figure 3:
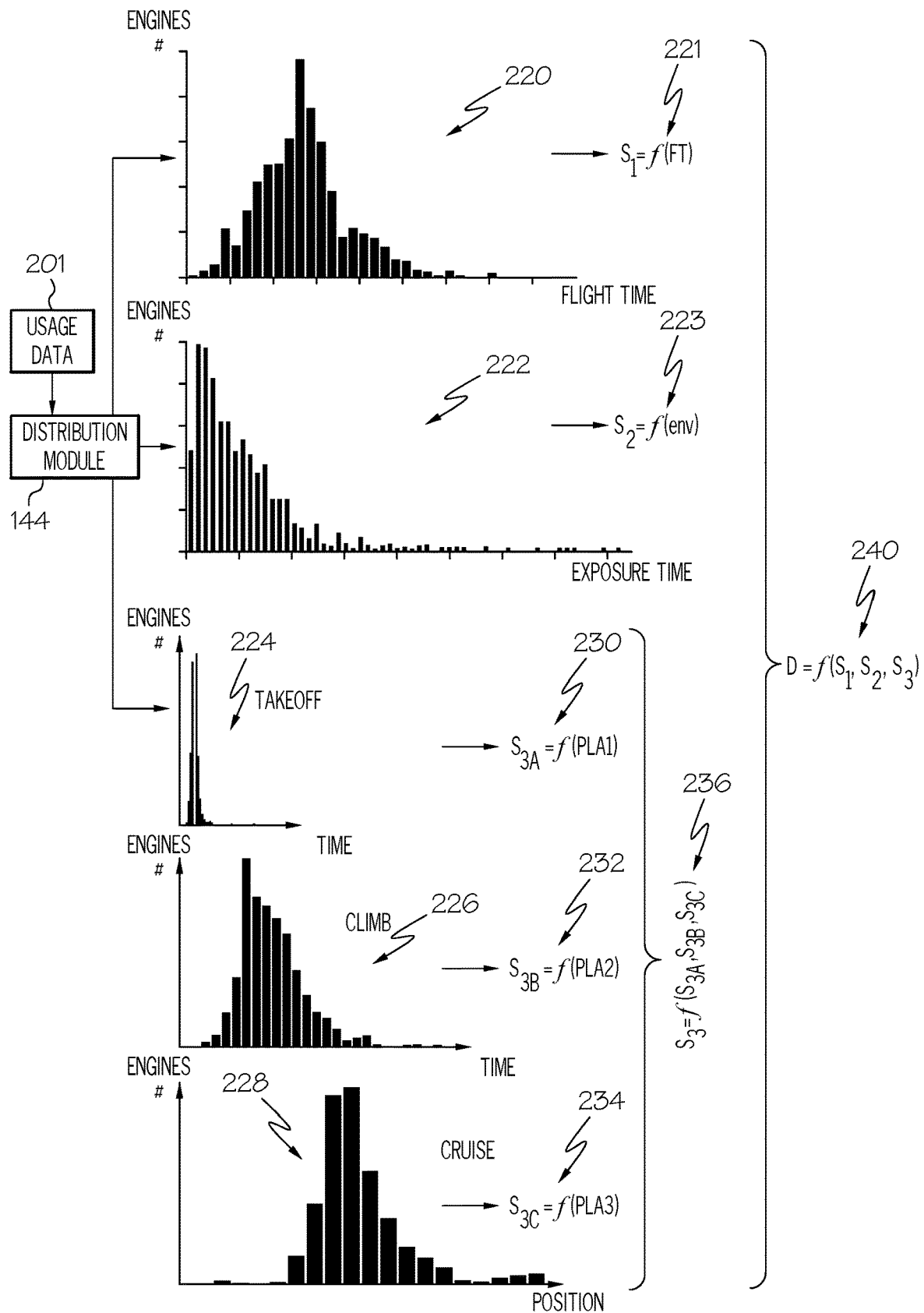
FIG. 3 is a schematic illustration of data processing performed according to the method of FIG. 2.

Subsequently, the method 200 may continue at 206, wherein the processor 140 generates fleet usage models. As shown in FIG. 3, the distribution module 144 may receive bulk usage data reported from the terminal devices 105 of the vehicles 102 within the fleet 101a. The distribution module 144 may be programmed to use statistical analysis to organize the usage data into a plurality of fleet usage distributions.

Specifically, from the usage data received at 204, the distribution module 144 may generate a first distribution 220 of flight length statistical data for the first fleet 101a. As shown, the first distribution 220 may include the 75th quartile of time (i.e., hours spent in flight) for each of the engines 103 within the first fleet 101a. (Average flight time is plotted on the X-axis, and the number of engines within the fleet 101a is plotted on the Y-axis.) From the first distribution 220, the distribution module 144 may generate a flight length usage model 221 for the fleet 101a. As will be discussed, the flight length usage model 221 may be used to evaluate a user's flight length usage characteristics against the rest of the fleet 101a and to assign a corresponding flight length score (S1). The flight length usage model 221 may be generated to meet various business goals and to establish a fair reward for certain members within the fleet 101a. The flight length usage model 221 may be formulated to, in general, provide larger rewards for users that fly longer flights.

Additionally, from the usage data received at 204, the distribution module 144 may generate a second distribution 222 of environmental exposure statistical data for the first fleet 101a. (Equivalent salt water days are plotted on the X-axis and the corresponding number of engines within the fleet 101a is plotted on the Y-axis). From the second distribution 222, the distribution module 144 may generate an environmental exposure usage model 223 for the fleet 101a. As will be discussed, the model 223 may be used to evaluate a user's environmental exposure usage characteristics against the rest of the fleet 101a and to assign a corresponding exposure score (S2). The model 223 may be generated to meet various business goals and to establish a fair reward for certain members within the fleet 101a. The model 223 may be formulated to, in general, provide larger rewards for users whose engines 103 spend less time in high salinity environments.

Moreover, from the usage data received at 204, the distribution module 144 may generate a third distribution 224, a fourth distribution 226, and a fifth distribution 228. The third distribution 224 may include time spent at takeoff power levels on the X-axis and the corresponding total number of engines 103 of the first fleet 101a on the Y-axis. The fourth distribution 226 may include time spent at climb power levels on the X-axis and the corresponding total number of engines 103 of the first fleet 101a on the Y-axis. The fifth distribution 228 may include the average throttle position (measured in degrees) for the vehicles 102 in the first fleet 101a on the X-axis and the corresponding total number of engines 103 on the Y-axis. From the third distribution 224, the distribution module 144 may generate a take-off usage model 230 for the fleet 101a. From the fourth distribution 226, the distribution module 144 may generate a climb usage model 232 for the fleet 101a. From the fifth distribution 228, the distribution module 144 may generate a cruise usage model 234 for the fleet 101a. As will be discussed, the models 230, 232, 234 may be used to evaluate a user's throttle power usage characteristics against the rest of the fleet 101a and to assign corresponding throttle power scores (S3A, S3B, and S3C, respectively). The models 230, 232, 234 may be generated to meet various business goals and to establish a fair reward for certain users within the fleet 101a. The models 230, 232, 234 may be formulated to, in general, provide larger rewards for users that fly for less time at take-off power and/or less time at climb power and/or lower throttle setting at cruise.

In some embodiments, the processor 140 may generate a combined throttle power model 236 from the distributions 224, 226, 228 and/or from the models 230, 232, 234. As will be discussed, the combined throttle power model 236 may be used to evaluate a user's throttle combined power usage characteristics against the rest of the fleet 101a and to assign a corresponding throttle power score (S3). The model 236 may be generated to meet various business goals and to establish a fair reward for certain users within the fleet 101a. The model 236 may be formulated to, in general, provide larger rewards for users that fly for less time at take-off power and/or less time at climb power and/or lower throttle setting at cruise.

Next, as shown in FIG. 2, the method 200 may continue at 208. At 208, the flight length usage model 221, the environment exposure usage model 223, the throttle power usage models 230, 232, 234, and the combined throttle power usage model 236 may be saved in the model database 156.

Subsequently, the method 200 may continue at 210. At 210, the processor 140 may generate a discount model 240. As will be discussed, the discount model 240 may be used to determine a maintenance discount for users within the fleet 101a according to their usage history. The discount model 240 may be generated to meet various business goals and to establish a fair reward for users within the fleet 101a. According to the discount model 240, usage that tends to cause less wear on an engine 103 can result in larger discounts for the user and vice versa.

Then, as shown in FIG. 2, the method 200 may continue at 212. At 212, the discount model 240 may be saved in the model database 156. Next, the method 200 may terminate.

Figure 4:
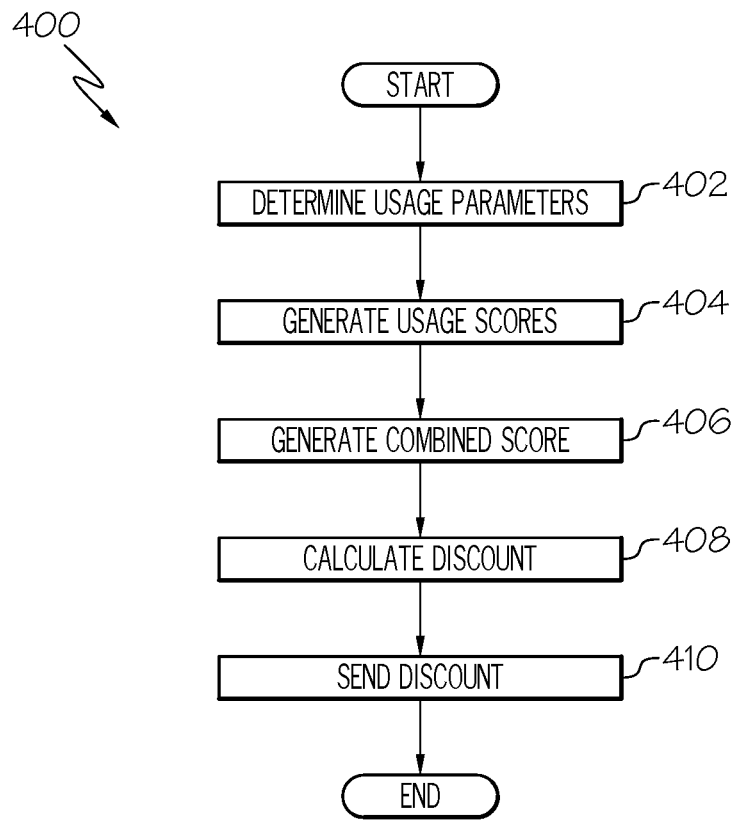
FIG. 4 is a flow chart illustrating a method of operating the system of FIG. 1 according to example embodiments.

Referring now to FIG. 4, a method 400 of operating the system 100 will be discussed according to example embodiments. In general, the method 400 may be employed for determining, for a time period, usage parameters of a vehicle 102. These usage parameters indicate usage characteristics of the vehicle 102 over the time period. The method 400 may also be used to score the determined usage parameters according to the fleet usage models 221, 223, 236 to produce a usage score. Additionally, the method 400 may be used to determine a maintenance discount according to the usage scores using the discount model 240.

The method 400 may begin at 402, wherein usage parameters for the respective engine 103 are determined for a given time period (e.g., one month). Continuing with the example discussed in relation to FIGS. 2 and 3, at 402 of the method 400, a flight time usage parameter can be determined to indicate how long the vehicle 102 spent in-flight during the time period. Also, an environmental exposure usage parameter can be determined to indicate how much the vehicle 102 was exposed to high-salinity environments during the time period. Moreover, a throttle power usage parameter may be determined to indicate how the engine 103 was powered during the time period. Accordingly, 402 of the method 400 may substantially correspond (and, in some embodiments coincide) with 202 of the method 200. The usage parameters may be saved at the usage database 152 of the server device 111.

Specifically, at 402 of the method 400, the sensor system 109 may detect different flight phases of the vehicle 102 using the FMS sensor 132 or other system, and the timer device 120 may record time spent between take-off and touch-down for different flights. In some embodiments, the processor 114 or processor 140 may process this time-of-flight data, for example, to find an average flight time for the engine 103 over the time period and/or to determine use cycles for the respective engine 103. Accordingly, an average flight time parameter 452 (FIG. 5A) over the time period may be determined for the vehicle 102.

Also, at 402 of the method 400, the sensor system 109 may locate the vehicle 102 during the time period using the positioning sensor 122. The timer device 120 may also detect the amount of time the vehicle 102 spends at the detected location(s). In some embodiments, the timer device 120 may record how long the vehicle 102 spends parked at the detected location(s). Also, the processor 140 may correlate the detected location(s) with the map 500 (FIG. 5B). In the example of FIG. 5B, the sensor system 109 detects that the vehicle 102 is located at four locations during the tracked time period. The four locations are indicated in FIG. 5B as a first location 501, a second location 502, a third location 503, and a fourth location 504. The timer device 120 may detect how long the vehicle 102 is parked at these four locations 501, 502, 503, 504. The processor 140 may calculate the "equivalent saltwater days" according an algorithm, wherein a day spent at the third location 503 counts as a full saltwater exposure day, wherein a day spent at the fourth location 504 counts for a fraction of a saltwater exposure day (e.g., 0.8 saltwater exposure days) and a day spent at the first and second locations 501, 502 count for a lower fraction of a saltwater exposure day (e.g., 0.5 saltwater exposure days). The processor 140 may perform this calculation and save the calculated saltwater exposure days as an environment exposure parameter 454 (FIG. 5A).

Moreover, at 402 of the method 400, the sensor system 109 may detect different flight phases of the vehicle 102 using the FMS sensor 132 or other system, and the timer device 120 may record time spent at take-off throttle settings. Additionally, the timer device 120 may record time spent at climb throttle settings. Furthermore, the sensor system 109 may detect and track the throttle position when the vehicle 102 is at cruise settings. The processor 114 or the processor 140 may process this data and determine multiple throttle parameters 456 (FIG. 5A), including an average time spent at take-off throttle settings for the time period, average time spent at climb throttle settings for the time period, and an average throttle position (measured in degrees) at cruise settings for the time period.

The method 400 may continue at 404, wherein the scoring module 148 generates usage scores according to the usage parameters 452, 454, 456 determined at 402. As such, the scoring module 148 evaluates usage history of the tracked vehicle 102 and/or engine 103 in comparison with the rest of the fleet 101a. The usage scores may be saved at the usage database 152 for the particular user.

Figure 5A:
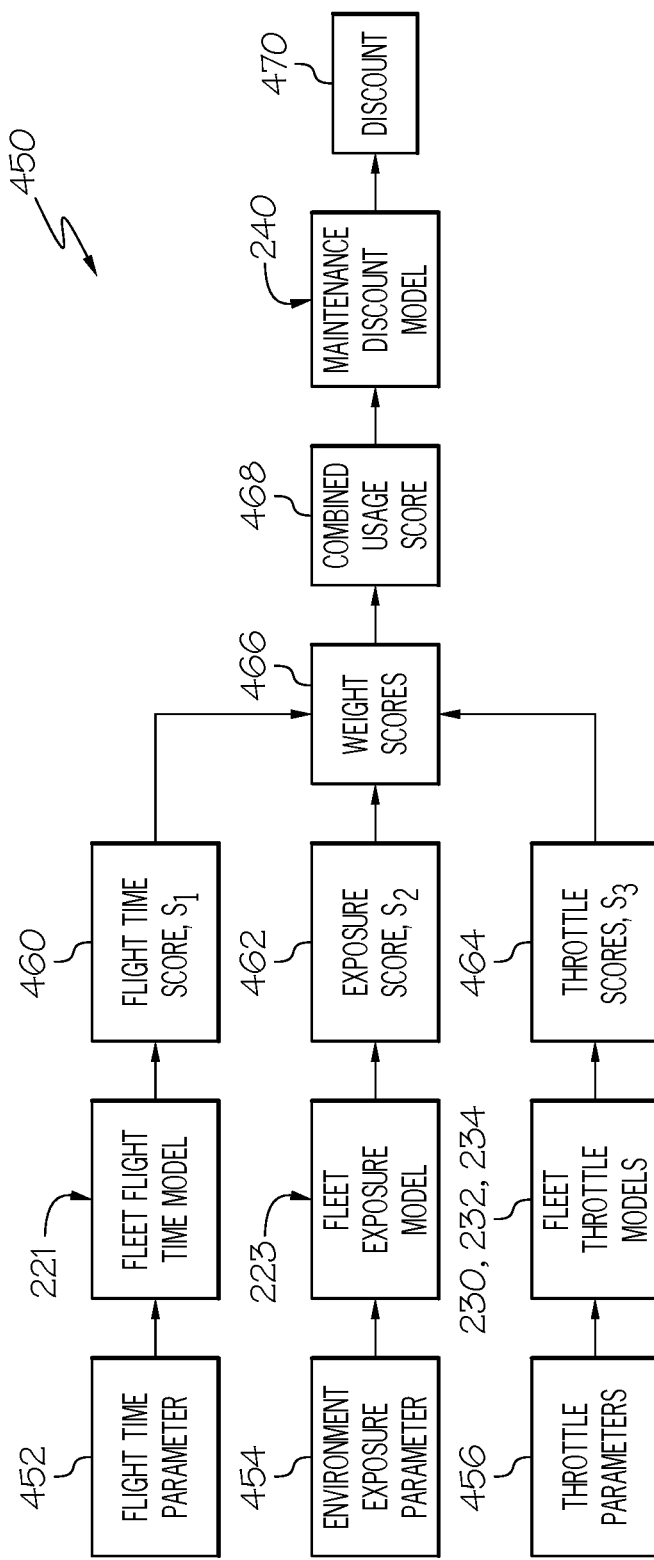
FIG. 5A is a schematic illustration of data processing performed according to the method of FIG. 4.
Figure 5B:
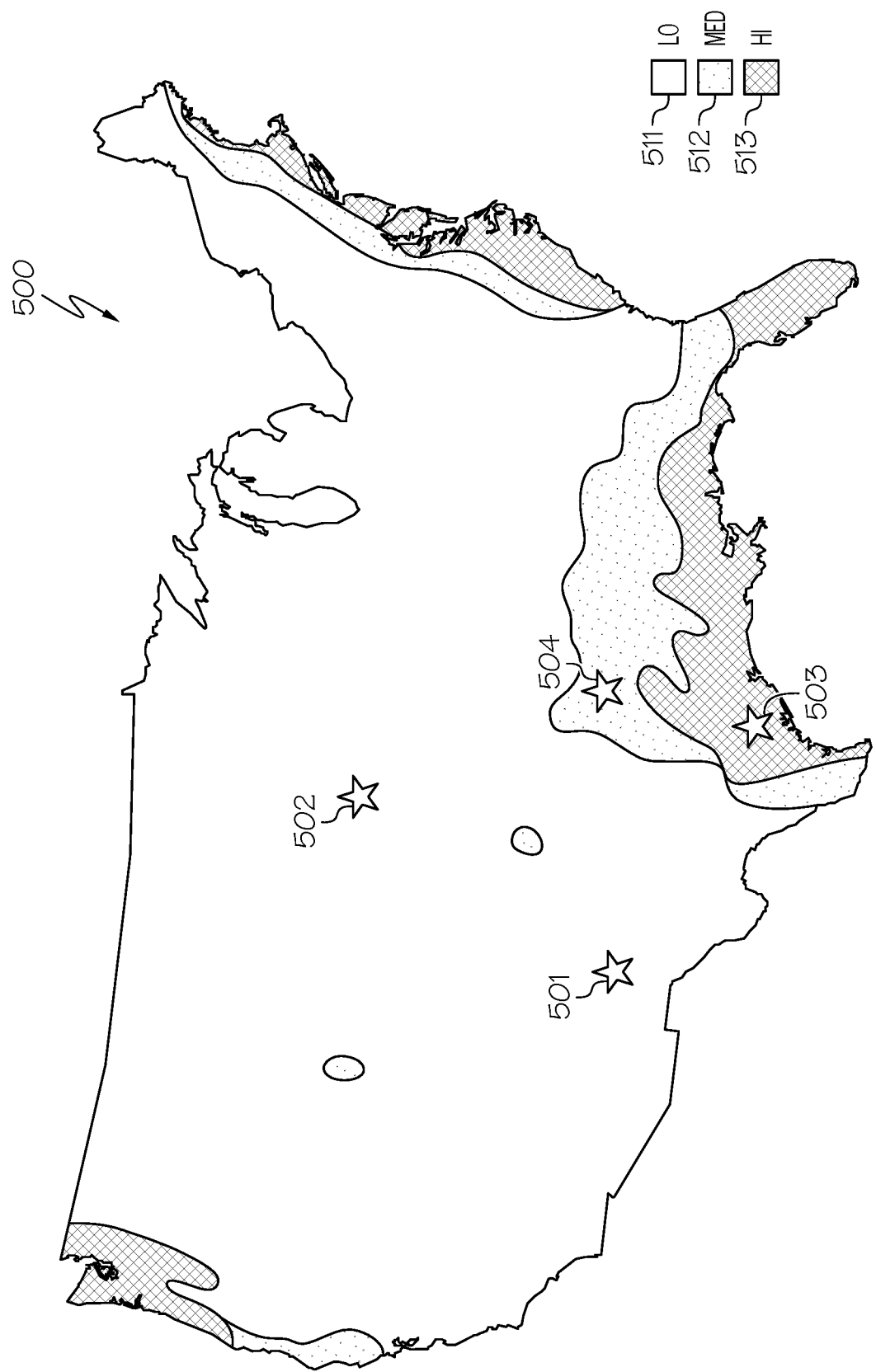
FIG. 5B is an environmental exposure map utilized in the methods of the present disclosure.

Specifically, as represented in the data flow process 450 of FIG. 5A, the scoring module 148 may utilize the fleet flight length usage model 221 and generate a flight time score S1 according to the flight time parameter 452 determined at 402. The flight time score S1 may range between zero and one in some embodiments, with higher average flight times receiving scores closer to one and vice versa.

Also, the scoring module 148 may utilize the fleet exposure model 223 and generate an exposure score S2 according to the environment exposure parameter 454 determined at 402. The exposure score S2 may range between zero and one in some embodiments, with higher amounts of exposure receiving scores closer to zero and vice versa.

Furthermore, the scoring module 148 may utilize the models 230, 232, 234 and generate throttle scores 464 according to the throttle power parameters 456 determined at 402. Using the take-off usage model 230, the processor 140 may generate a take-off score S3A according to the average take-off time parameter determined at 402. The take-off score S3A may range between zero and one in some embodiments, with lower average take-off times receiving scores closer to one and vice versa. Moreover, using the climb usage model 232, the processor 140 may generate a climb score S3B according to the average climb time parameter determined at 402. The climb score S3B may range between zero and one in some embodiments, with lower average climb times receiving scores closer to one and vice versa. Additionally, using the cruise usage model 234, the processor 140 may generate a cruise score S3C according to the average cruise throttle position parameter determined at 402. The cruise score S3C may range between zero and one in some embodiments, with lower average cruise throttle positions receiving scores closer to one and vice versa. In some embodiments, these three throttle scores S3A, S3B, S3C may be combined into the single combined throttle power score S3 according to the combined throttle power model 236. For example, the processor 140 may weight the three throttle scores S3A, S3B, S3C to produce the combined throttle power score S3. In other words:

$$S3 = a*S3A + b*S3B + c*S3C$$

where a, b, and c, are the applied weight variables, and where the sum of a, b, and c is equal to one (1). In some embodiments, the processor 140 may weight the three throttle scores S3A, S3B, S3C equally (i.e., a, b, and c are equal to ⅓); however, it may be appreciated that more weight may be applied to one throttle score than another.

The method 400 may continue at 406, wherein the scoring module 148 combines the flight time score S1, the exposure score S2, and the throttle power score S3 and generates a combined usage score 468 for the vehicle 102 and engine(s) 103 tracked at 402. The combined usage score 468 may be saved at the usage database 152 of the server device 111.

In some embodiments, represented in FIG. 5A, the processor 140 may apply different weights 466 to the flight time score S1, the exposure score S2, and the throttle score S3 to produce the combined usage score 468. For example, average flight time may have the strongest correlation to engine wear rate. Therefore, the flight time score S1 may be weighted heavier than the exposure score S2 and the throttle score S3. Also, the amount of environment exposure may have the next highest correlation to engine wear rate. Thus, the exposure score S2 may be weighted heavier than the throttle power score S3. The throttle power parameters may have the loosest correlation to engine wear; therefore, the processor 140 may apply the smallest weight to the throttle score S3. Accordingly, in some embodiments, the combined usage score 468 may range between zero and one. Combined usage scores 468 closer to one may reflect usage that tends to cause less wear on the engine 103. Scores closer to zero may reflect usage that tends to cause more wear on the engine 103.

Next, at 408 of the method 400, the discount module 149 may determine a discount for the user of the vehicle 102 and engine(s) tracked at 402. The discount module 149 may utilize the discount model 240 to determine a discount 470 according to the combined usage score 468. A higher combined usage score 468 may result in a higher discount 470, and a lower combined usage score 468 may result in a smaller discount 470. Also, the processor 140 may access the contract database 150 and correlate the discount 470 with the contract for the corresponding user.

Then, at 410 of the method 400, information about the discount 470 may be communicated to the user. For example, the server device 111 may send control commands to the terminal device 105 of the vehicle 102 tracked at 402. The control commands may cause the user interface 104 to output the calculated discount 470. In some embodiments, the discount 470 may be displayed visually by the user interface 104.

Figure 6:
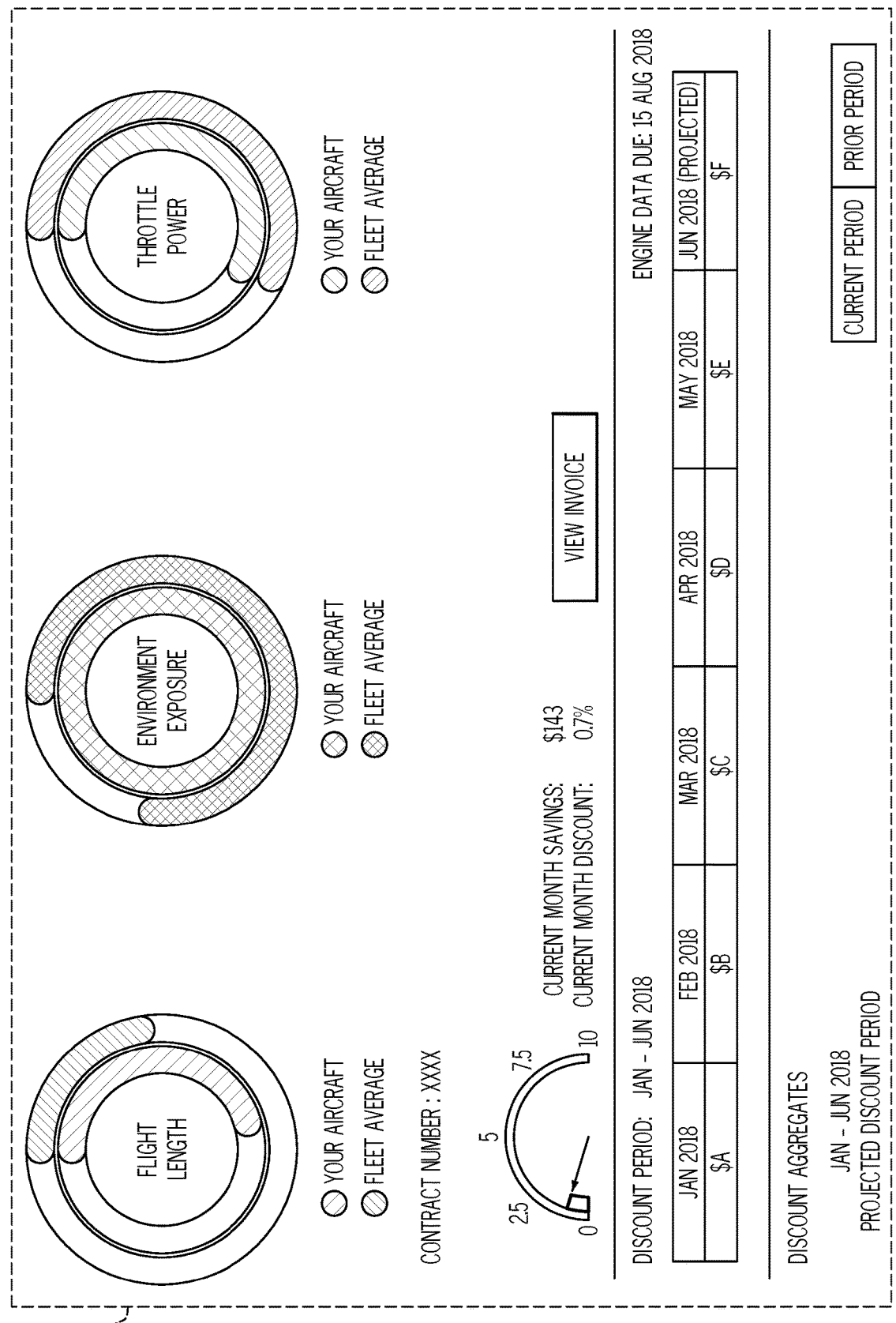
FIG. 6 is a schematic illustration of a user interface of the system according to example embodiments of the present disclosure.

In some embodiments represented in FIG. 6, the user interface 104 may display a user's contract number along with a visual representation of their usage scores for the past month. The fleet average may also be displayed for purposes of comparison. The "current month savings" and "current month discount" (calculated at 408) may be displayed as well. Additionally, past usage and/or past discount information from another time period may also be displayed.

Accordingly, the system 100 and methods 200, 400 of the present disclosure provide fairer pricing for maintenance and/or other services. Users that use the engine in a manner which results in lower maintenance costs can earn higher discounts than users that put more strain on their engine. Also, users may be incentivized to use a vehicle 102 and its engine(s) 103 in a manner that causes less wear over time. Additionally, the models used for adjusting and determining user discounts can be formulated for efficiently and effectively rewarding users at different levels based on their usage history. Furthermore, the system 100 and its methods 200, 400 can provide useful information to users about their usage history and how it compares to the rest of the fleet.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It being understood that various changes may be made in the function and arrangement of elements described in an exemplary embodiment without departing from the scope of the present disclosure as set forth in the appended claims.

What is claimed is:

1. A method of operating a usage-based maintenance system for a vehicle among a plurality of vehicles arranged in a fleet, the method comprising:
   receiving, by a processor from a sensor system of the fleet, sensor input;
   determining, by the processor from the sensor input and for a time period, an exposure parameter of the vehicle, the exposure parameter indicating an amount of exposure to an environment during the time period;
   scoring, by the processor, the determined exposure parameter according to a fleet exposure model to produce an exposure score, the fleet exposure model based on the amount of exposure to the environment of the plurality of vehicles across the fleet;
   determining, by the processor from the sensor input and for the time period, another usage parameter of the vehicle, the other usage parameter indicating another usage characteristic of the vehicle over the time period;
   scoring, by the processor, the determined other usage parameter according to another fleet usage model to produce another usage score, the other fleet usage model based on the other usage parameter of the plurality of vehicles across the fleet;
   combining, by the processor, the exposure score and the other usage score to produce a combined usage score;
   determining, by the processor, a value of a maintenance discount according to the combined usage score within a discount model of the fleet; and
   displaying, on a display of a terminal device that is onboard or offboard of the vehicle, the determined value of the maintenance discount.

2. The method of claim 1, wherein determining the exposure parameter includes detecting a location of the vehicle and detecting an amount of time spent at the detected location; and
   determining the exposure parameter according to the detected amount of time spent at the detected location.

3. The method of claim 2, wherein detecting the location of the vehicle includes detecting the location of the vehicle within one of a plurality of identified environmental exposure zones, the plurality of identified environmental exposure zones having different assigned exposure levels; and
   wherein determining the exposure parameter includes determining the exposure parameter according to the detected amount of time spent at the assigned exposure level for the detected location.

4. The method of claim 3, wherein determining the exposure parameter includes determining an equivalent number of days spent in the environment.

5. The method of claim 3, wherein detecting the location of the vehicle includes:
   detecting the location of the vehicle with a Global Positioning System (GPS).

6. The method of claim 1, wherein the exposure parameter is a salinity exposure parameter.

7. The method of claim 1, further comprising collecting exposure data from across the fleet and creating the fleet exposure model from the collected exposure data.

8. A usage-based maintenance system for a vehicle among a plurality of vehicles arranged n a fee the system comprising;
   a processor;
   a sensor system configured to provide sensor input to the processor;
   a data storage device having a fleet exposure model, another fleet usage model, and a discount model of the fleet stored thereon;
   the processor configured to determine from the sensor input, for a time period, an exposure parameter of the vehicle, the exposure parameter indicating an amount of exposure to an environment during the time period;
   the processor configured to score the determined exposure parameter according to the fleet exposure model to produce an exposure score, the fleet exposure model based on the amount of exposure to the environment of the plurality of vehicles across the fleet;
   the processor configured to determine from the sensor input, for the time period, another usage parameter of the vehicle, the other usage parameter indicating another usage characteristic of the vehicle over the time period;
   the processor configured to score the other usage parameter according to the other fleet usage model to produce another usage score, the other fleet usage model based on the other usage parameter of the plurality of vehicles across the fleet;
   the processor configured to combine the exposure score and the other usage score to produce a combined usage score;
   the processor configured to determine a value of a maintenance discount according to the combined usage score within the discount model; and
   the processor configured to display, on a display of a terminal device that is onboard or offboard of the vehicle, the determined value of the maintenance discount.

9. The system of claim 8, wherein the sensor system is configured to detect a location of the vehicle and detect an amount of time spent at the detected location; and
   wherein the processor is configured to determine the exposure parameter according to the amount of time spent at the detected location.

10. The system of claim 9, wherein the processor is configured to determine the location of the vehicle within one of a plurality of identified environmental exposure zones, the plurality of identified environmental exposure zones having different assigned exposure levels; and
    wherein the processor is configured to determine the exposure parameter according to the detected amount of time spent at the assigned exposure level for the detected location.

11. The system of claim 10, wherein the processor is configured to determine an equivalent number of days spent in the environment.

12. The system of claim 10, wherein the sensor system includes a global positioning system (GPS) configured to detect the location of the vehicle.

13. The system of claim 8, wherein the exposure parameter is a salinity exposure parameter.

14. The system of claim 8, wherein the processor is configured to collect exposure data from across the fleet and create the fleet exposure model from the collected exposure data.

15. The system of claim 8, wherein the processor is configured to:
    determine, for the time period, a flight time parameter of the vehicle, the flight time parameter indicating time spent in-flight during the time period;

determine, for the time period, a throttle power parameter of the vehicle, the throttle power parameter indicating powering of an engine of the vehicle during the time period;

score the flight time parameter according to a fleet flight time usage model to produce a flight time score;

score the throttle power parameter according to a fleet throttle power usage model to produce a throttle power score;

combine the exposure score, the flight time score, and the throttle power score to produce the combined usage score; and determine the value of the maintenance discount according to the combined usage score.

16. A method of operating a usage-based maintenance system for an aircraft among a plurality of aircraft arranged in a fleet, the method comprising:

detecting, by a sensor system of the fleet and for a time period, a location of the aircraft and detecting an amount of time spent at the detected location;

receiving, by a processor from the sensor system sensor input indicative of the location and the amount of time spent at the detected location;

determining, by the processor from the sensor input and for the time period, a salinity exposure parameter of the aircraft according to the detected amount of time spent at the detected location;

scoring, by the processor, the salinity exposure parameter according to a fleet exposure model to produce an exposure score, the fleet exposure model based on the salinity exposure of the plurality of aircraft across the fleet;

determining, by the processor from the sensor input and for the time period, another usage parameter of the aircraft, the other usage parameter indicating another usage characteristic of the aircraft over the time period;

scoring, by the processor, the other usage parameter according to another fleet usage model to produce another usage score, the other usage model based on the other usage parameter of the plurality of aircraft across the fleet;

combining, by the processor, the exposure score and the other usage score to produce a combined usage score;

determining, by the processor, a value of a maintenance discount according to the combined usage score within a discount model of the fleet; and displaying, on a display of a terminal device that is onboard or offboard of the aircraft, the determined value of the maintenance discount.

17. The method of claim 1, further comprising generating the discount model.

18. The method of claim 8, further comprising generating the discount model.

19. The method of claim 16, further comprising generating the discount model.

* * * * *